Feb. 19, 1963   W. W. McCADAM   3,078,169
METHOD FOR MAKING CHEESE
Filed Feb. 27, 1957   3 Sheets-Sheet 1

INVENTOR:
William W. McCadam
BY
Curtis, Morris & Safford
ATTORNEYS.

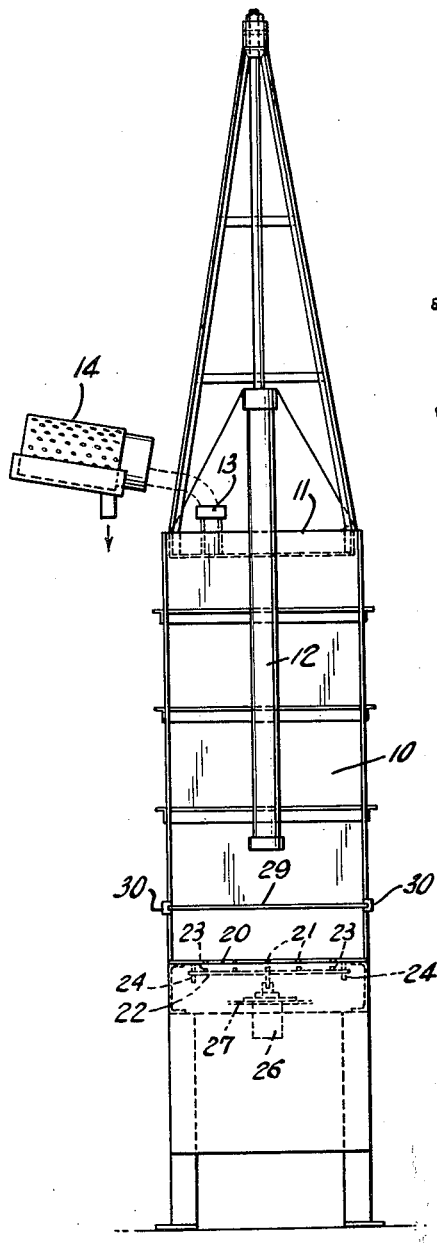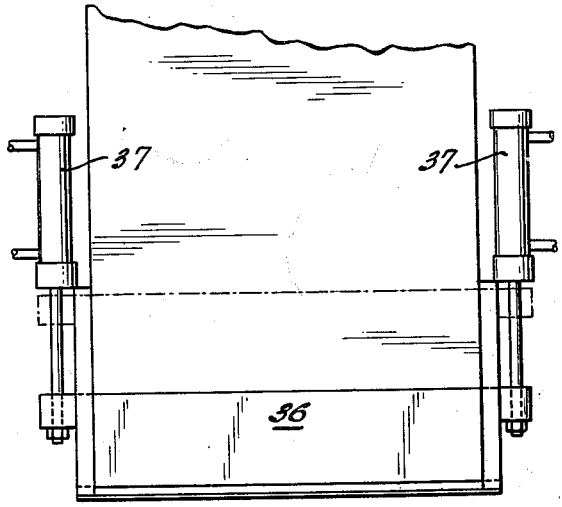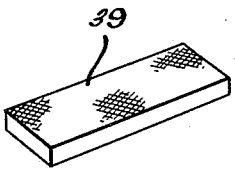

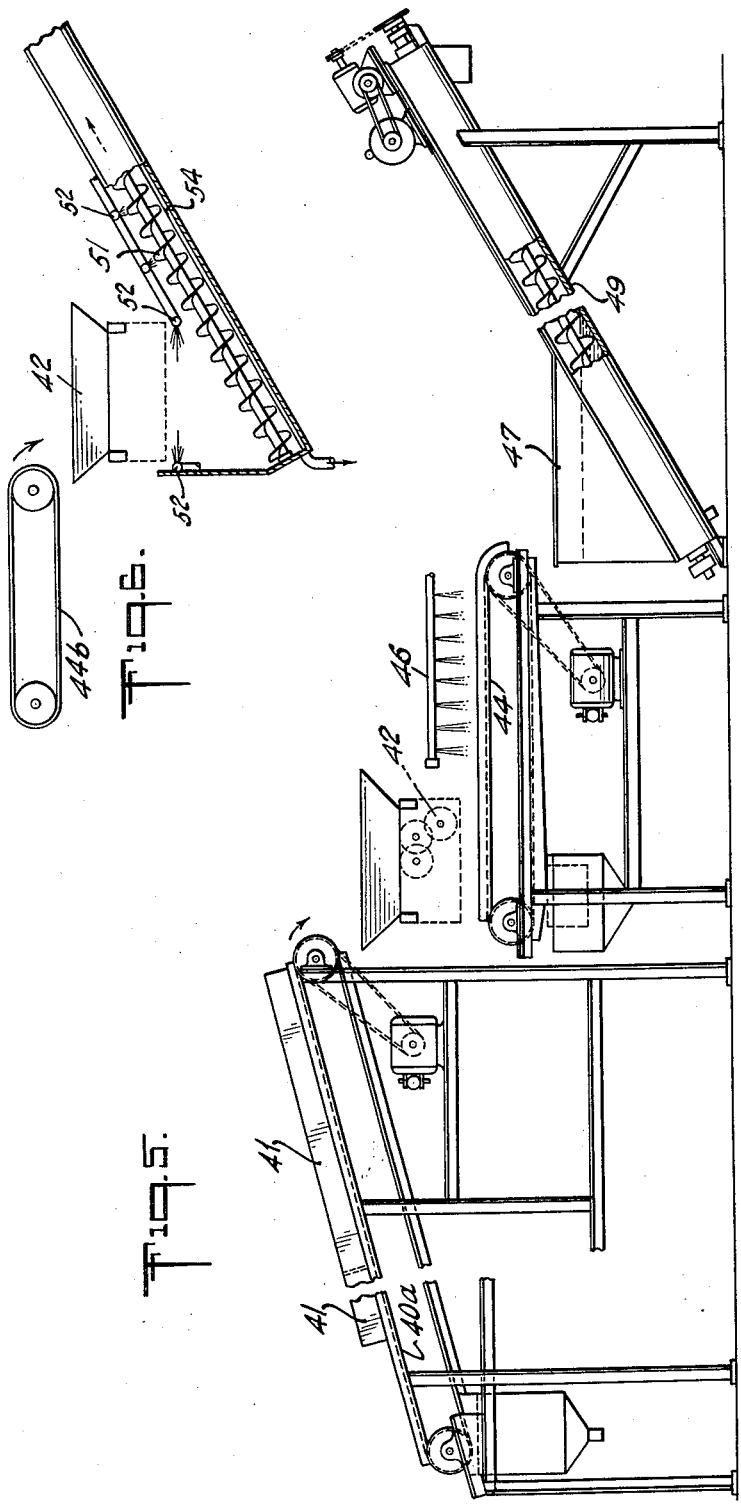

United States Patent Office 3,078,169
Patented Feb. 19, 1963

3,078,169
METHOD FOR MAKING CHEESE
William W. McCadam, Heuvelton, N.Y., assignor to Ched-O-Matic Corporation, Heuvelton, N.Y., a corporation of New York
Filed Feb. 27, 1957, Ser. No. 642,783
7 Claims. (Cl. 99—116)

This invention relates to a novel method and apparatus for making cheese, particularly the type of hard cheese popularly known as Cheddar cheese.

Conventional methods of making a Cheddar type cheese include the steps of adding starter and rennet to milk in a large vat having a capacity of say 10,000 to 15,000 pounds; maintaining the milk at a temperature of about 85° F. for about a half hour, during which time the milk coagulates or sets to form a jelly-like mass; manually cutting this mass into cubes, referred to in the trade as "curds," with vertical and horizontal wire cutters, heating and agitating the curd and the whey which exudes from the curd kernels to a temperature of approximately 100° F. or slightly higher; draining off most of the whey; cutting the remaining curd into blocks; manually turning the blocks over in the vat and eventually piling them on top of one another while maintaining them at approximately 100° F.; milling the blocks into smaller blocks; salting them and finally pressing them into forming hoops.

It will readily be appreciated that the results obtained are dependent in large part upon the judgment and experience of the attendants and further that the process is inherently unsanitary. Thus, for example, the turning of the blocks of curd in the vat, and operation known in the trade as cheddaring, requires two attendants leaning over the vat to manually pick up and turn over the curd blocks one at a time while temperatures in the vat are maintained in the vicinity of 100° F. It is the purpose of this treatment to promote full development of acid in the curd, expulsion of the whey and removal of any voids. The extent to which these objectives are attained depends upon the skill, judgment and even the disposition of the attendants who, in the last analysis, determine the frequency of turning and the duration of the cheddaring treatment. It is also manifest, for example, that the salting, carried out by sprinkling salt on the milled curd lying on the bottom of the vat is not only unsanitary but haphazard by virtue of unevenness of distribution and of absorption by the curd.

It is the principal object of this invention to provide a method and apparatus for making cheese that avoids unsanitary conditions such as these and makes the final quality of the product less dependent upon the skill or whim of the operator.

In accordance with the preferred embodiment of the invention, the operations that are most vulnerable to unsanitary conditions and most likely to result in non-uniformity of the product are performed in an entirely different and novel manner. Thus, in one phase of the method of the invention, the tedious and inherently unsanitary curd block turning process is replaced by a whey removal and curd operation that minimizes loss of heat and contact of the curd with the atmosphere and provides excellent control over the acid development and expulsion of moisture. In another phase of the invention all of the operations following the pressing of the curd are made continuous and substantially automatic, the curd being continuously and automatically shredded, washed and uniformly salted prior to hooping.

The apparatus of the invention generally comprises a whey expulsion press of novel construction, a conveyor for continuously receiving blocks of curd from the press and transporting them to a shredder, means for washing and salting the shredded curd, and a screw conveyor mechanism for removing the shredded and salted curd for hooping.

The utility and advantages of the method and apparatus of the invention will be described in more detail with reference to the accompanying drawing illustrating the best mode now contemplated for practicing the invention.

In the drawing:

FIGURE 2 is an end view in elevation of the apparatus shown in FIGURE 1, including a device for preliminarily draining some of the whey from the curd;

FIGURE 3 is a view in elevation, on an enlarged scale and with the conveyor removed, of the vertical knife and knife actuating mechanism shown in FIGURE 1;

FIGURE 4 is a view in perspective of a slab of pressed curd delivered by the whey expulsion press illustrated in FIGURES 1 to 3;

FIGURE 5 is a schematic view showing one embodiment of a conveyor and other apparatus for continuously processing slabs of curd delivered by the whey expulsion press; and FIGURE 6 is a schematic view of a preferred embodiment of apparatus for shredding, washing and salting slabs of curd delivered from the whey expulsion press.

Figure 1:
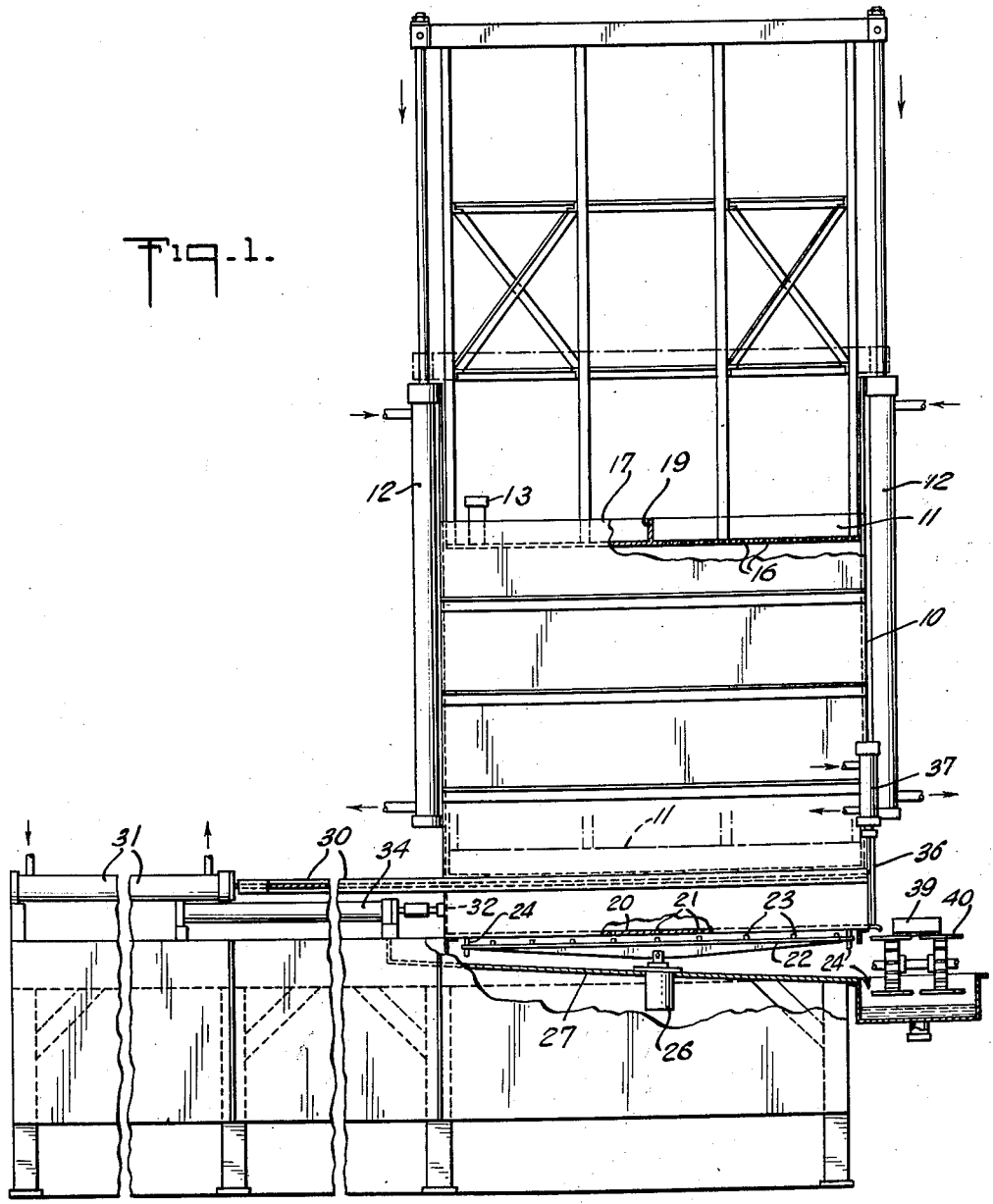
FIGURE 1 is a view in elevation of a whey expulsion press including a device for cutting a curd block into mill blocks.

Referring now to FIGURES 1 and 2, the whey expulsion press comprises a rectangular vessel 10 provided with a vertically movable platen 11 whose movement within the vessel 10 is controlled by hydraulic cylinders 12. The platen 11 is provided with a suitable filling pipe 13 for receiving curd and whey from suitable means such as a rotatable foraminous drum 14 for preliminarily removing part of the whey by tumbling the suspension of curds in whey. In the embodiment illustrated, part of the area of the platen 11 is perforated as shown at 16. The other, non-perforated area 17 of the platen, is separated from the perforated area 16 by a screen 19.

The bottom of the vessel 10, as shown for purposes of illustration, comprises a fixed plate 20 having perforations 21. Under the plate 20 there is a vertically movable plate 22 having upstanding plugs 23 which, when the plate 22 is in its normally elevated position, fit within the perforations 21 and form a substantially unbroken plane surface with the top of the fixed plate 20. The plate 22 is positioned by guide pins 24 and actuated for vertical movement at a preselected time in the operation of the press by means indicated at 26. Below the bottom assembly 20, 22 there is provided a suitable drainage board 27 for collecting fluid leaving the vessel 10 by way of perforations 21.

The lower portion of the vessel 10 is provided with a parting knife and partition 29 movable horizontally in a slide or track 30 and actuated by a hydraulic cylinder 31 or equivalent means. Immediately below the parting knife 29 and in a cut-out portion of the side wall there is provided an extrusion piston 32 flush with the side wall and actuated by the hydraulic cylinder 34 or equivalent means. At the opposite side in the lower portion of the vessel 10 there is a vertical cut-off knife 36 actuated by hydraulic cylinders 37 for cutting a block of curd into a mill slab 39, shown in FIGURE 1 as resting on a conveyor 40.

Referring now particularly to the embodiment shown in FIGURE 5, a slab conveyor 40a is provided with a cover 41 and with suitable pressure means such as rollers or plates, not shown. The delivery end of the conveyor terminates over a shredder or milling machine, shown schematically at 42, and a second conveyor 44 is shown for conveying the thredded or milled curd under a water spray 46 to a brine tank 47 and a covered screw conveyor 49.

An alternate and preferred curd treating apparatus is shown in FIGURE 6. A slab conveyor 44b is provided for transporting the slab blocks 39 to a shredder 42, from which shredded or milled curd is deposited directly in a hopper 50 for a screw conveyor 51, the curd being washed and salted by spraying with one or more brine sprays 52. The underside of the conveyor 51 is advantageously provided with a groove 54 for draining off excess moisture as the curd is advanced through the conveyor. In operation, a suspension of curd and whey having a total acid content (a term used herein to refer to the total titratable acidity of the whey, expressed as percentage of lactic acid) of between about 0.16 and 0.25% is introduced into the vessel 10 from a conventional cheese vat or the like. The method of obtaining an acidity within the 0.16 to 0.25% range specified is conventional and well known to those skilled in the art, it being normal practice to condition the amount of starter and rennet utilized to the quality, and particularly the fat content, of the milk and also to adjust the coagulation and cooking time and temperature correspondingly. Conventional methods of cooking may, however, advantageously be modified in accordance with the invention to the extent of cooking at slightly lower temperatures and thus achieving better texture than is obtainable at the slightly higher temperatures. Also, it is desirable to drain off as much of the whey as possible, usually about 50%, in the cheese vat and in a rotating foraminous drum 14 before introducing the suspension into the vessel 10, care being taken however not to drain off so much whey in the vat that the suspension becomes unpumpable or otherwise resistant to transfer from the vat to the drum.

When the drained contents of a cheese vat have been passed through the drum 14 and emptied into the vessel 10, the platen 11 is moved downwardly, by actuation of cylinders 12, to drain off any free whey at the top of the suspension through the perforations 16. The free whey thereupon passes to the non-perforated portion 17 by way of the filter screen 19, which filters out particles of curd that may have passed through the perforations 16. From the non-perforated portion 17 of the platen 11, the free whey is siponed out or otherwise removed by means forming no part of the invention. An additional quantity of free whey is removed from the bottom of the curd mass by lowering the movable plate 22 sufficiently to allow free whey to drain through the perforations 21 for collection in the drain 27.

When the suspension of curds and whey has been introduced into the whey expulsion press, periodic or continuous acidity determinations are carried out in order to follow the rate of acid development and correlate it with the moisture content. It is the general objective in the press to develop an acid content of between about 0.5 and 0.85%, preferably between about 0.6 and 0.75%, more or less simultaneously with a reduction of the moisture content in the curd to between about 35 and 40%. If the desired acid content is achieved before the moisture contnet is reduced to the desired range, the final cheese product tends to be sour. If on the other hand the desired moisture level is reached before the acid value reaches the desired range, the development of acid is curtailed and perhaps stopped entirely so that the desired acid content may never be achieved. Application of relatively high pressure before the acid content has increased to about 0.4% is generally undesirable because in that stage the curd particles are fragile, they release moisture only with difficulty, and a reduced yield, because of the escape of casein with the whey, would ensue. Inasmuch as the bacteria convert the sugar of the whey in the curd into acid and the sugar content is related to the whey content, adjustment of acid development and hence final acidity, and correlation thereof with the moisture content is obtained by controlling the sugar content through control of the rate of whey expulsion.

Experience in operating this phase of the method of the invention has shown that it is generally necessary to increase the pressure on the curd from an initial value of approximately .45 p.s.i.g. (lbs. per square inch, gage) to .6 p.s.i.g. to final values as high as about 1.75 p.s.i.g., depending upon the rate and manner in which acid development takes place. Thus, for example, a suspension having an initial acid value when introduced into the press of 0.18% was subjected to an initial pressure of .48 p.s.i.g., the pressure was increased an average of .086 p.s.i.g. every ten minutes for eighty minutes at the end of which time the acid level was .54% and the pressure was 1.19 p.s.i.g. Thereafter, both the rate of acid development and the rate of increase in pressure were reduced until at the end of 170 minutes the acid value was 0.75%, the moisture content was between 35 and 40% and the pressure was approximately 1.56 p.s.i.g.

In another run, the acid content rose rapidly from an initial value of 0.25% to a value of 0.6% in eighty minutes, the pressure in the meantime being gradually increased from 0.57 to 1.30 p.s.i.g. Thereafter, the acid developed still more rapidly to a value of 0.85% after a total of 100 minutes, the pressure in the meantime being increased just as rapidly to 1.75 p.s.i.g. These two runs represent extremes, it generally being preferable for optimum quality of the final cheese, to start with a suspension having an acid value higher than 0.16 and lower than 0.25 and to so adjust the increase in pressure as to attain an acid value between about .6 and .75% and a moisture content of 35 to 40% in approximately 130 minutes. It is to be understood, of course, that if the milk used initially has a fat content higher than the normal 3.5±0.5% of cheese milk, generally higher pressures must be employed to compensate for the slower release of moisture in order to obtain the desired final 35 to 40% moisture content unless compensation has already been effected through the use of somewhat higher cooking temperatures in the cheese vat.

When the whey expulsion operation has been completed and the desired acid value and moisture content have been achieved, the curd remaining in the press is in a sufficiently coherent state to form a block having a toughness and general characteristics similar to those exhibited by blocks of curd that are obtained as the end of a conventional cheddaring operation. With the plate 22 returned to its higher position, the hydraulic cylinder 31 is actuated to advance the parting knife and partition 29 across the bottom 20 of the vessel 10 as indicated in FIGURE 1. When the knife has completed its motion across the vessel, the vertical knife 36 is elevated to its upper retracted position and the plunger 32 is advanced several inches. The vertical knife 36 is thereupon lowered by the action of hydraulic cylinders 37 to cut a block of pressed curd in the bottom of the vessel 10 into a mill slab 39 which is deposited, as shown in FIGURE 1, upon the conveyor 40. The knife 36 is retracted to its uppermost position and the operation is repeated, the plunger 32 and the knife 36 being operated alternately until the plunger reaches the right side of the vessel 10 as illustrated in FIGURE 1. The plunger is then retracted to its leftmost position, and the parting knife and partition 29 are likewise retracted so as to allow the curd block in the vessel 10 to move down into contact with the bottom member 20. The sequence of operations is then repeated beginning with the movement of the parting knife and partition 29 and proceeding with the alternate movements of the plunger 32 and the vertical knife 36 until the entire curd block in the press has been extruded, cut and deposited upon the conveyor 40. The mill blocks 39 of curd deposited on the conveyor 40 may be any desired size as will be well understood by those skilled in the art.

In the operation described by way of example with reference to FIGURE 5, the blocks were cut to have dimensions, when lying flat on the conveyor 40a, of 24″ x 6″ x 2″. Upon being deposited on the conveyor 40a the blocks passed under the hood 41 in which they were maintained at a temperature of approximately 98 to 102° F. as in the curd press and were subjected to pressure by rollers or equivalent means in order to increase the coherence of the curd particles for one another. In the particular operation described, four rollers weighted successively to exert pressures of 1.27, 1.91, 3.05 and 2.55 p.s.i.g. on the mill blocks were employed and this resulted in flattening out the blocks until they had dimensions of approximately 30 x 10–12 x 1 inches.

The pressed mill blocks thereupon were fed continuously into a shredder or milling machine 42 and the shredded curd particles were deposited on a second conveyor 44. The shredded curd particles were thereupon washed with water while on the conveyor 44. Under normal conditions and in the particular operation described, the temperature of the water spray 46 was approximately 100° F. It is however possible, and in fact desirable if there is any appreciable departure from normal acid development or removal of moisture in the whey expulsion press, to vary the temperature of the water and thereby in part compensate for such departure. Thus, for example, if the development of acid in the whey expulsion press was unduly rapid and the moisture content is somewhat higher than optimum, the temperature of the water in the spray 46 should be raised to approximately 110 to 115° F. to thereby rinse out some of the excess acid and sugar and thus contribute to a shrinking of the curd. On the other hand, if the shredded curd is somewhat deficient in water content, rinsing with cold water will tend to seal the fat in and increase the moisture content somewhat. It is to be understood, therefore, that while the step of rinsing with water is not critical or necessary to the method, it is preferred for optimum cohesion of the curd particles and texture of the final cheese, removal of "butterfat" from the surface of the shredded curd particles, and most uniform absorption of salt in the next step. It is also preferred if it is desirable to make minor adjustments in the acid content or moisture content of the shredded curd.

The conveyor 44 deposited the shredded and washed curd in a salt brine solution having a salt concentration of about 5% and maintained at a temperature of about 100° F. for an average residence time of about one minute in the tank 47.

Generally, the brine solution should have a salt content in the range of about 5 to 20%, the general preference being in the lower portion of this range and in the vicinity of 5%. Its temperature should be of the order of 90 to 110° F., 90° F. being about the minimum for further promoting cohesion of the curd particles and a practical rate of penetration of the salt into the interior of the curd. The residence time for the curd particles in the brine solution should be of the order of about one minute when the temperature is between about 90 and 110° F. and the salt concentration is about 5%. For higher salt concentrations the residence time should be correspondingly short inasmuch as the object of the treatment with salt brine is to achieve a salt concentration in the curd of between about 1.5 and 2%, preferably 1.7 to 1.8%. The screw conveyor 49 continuously removes the salted curd from the brine tank 47 for hooping and curing operations well known to the art.

In the preferred embodiment of the invention, the mill blocks 39 of curd are, as illustrated in FIGURE 6, moved by means of a suitable conveyor 40b to a shredder 42. The shredded or milled curd is dropped into the hopper 50 of a screw conveyor 51, being simultaneously washed and salted by sprays of saturated salt solution, preferably maintained at 90 to 110° F., from brine sprays 52.

This embodiment is preferred because it lends itself to maximum control over the amount of salt taken up by the curd and avoids problems of varying residence times of curd in a brine bath. If sampling indicates that more salting is required, it is a simple matter to bring one or more additional brine sprays 52 into operation or to slow down the rate of advancement of curd.

One of the most outstanding advantages of the method and apparatus of the invention is that while the curd and whey are in the whey expulsion press, it is possible for the operator to follow the development of acid in the curd as reflected by the change in acid content of the whey and thus to regulate intelligently the increase in pressure on the mass so that the removal of moisture will properly keep pace with the development of acid, whereas in the normal cheddaring operation the turning and piling of the blocks is dependent entirely on the visual perception and experience of the operator.

Other important advantages of this phase of the method of the invention as well as of the succeeding steps of shredding, rinsing, and salting, are the inherently greater opportunities for providing sanitary facilities in the production of cheese and for the use of labor saving mechanization.

A further advantage of the washing and salting method and apparatus illustrated in FIGURE 6 resides in the ease of control over the final salt content of the curd, and therefore, in the aging properties of the cheese produced.

The finished cheese prepared in accordance with the method of the invention is characterized by uniformly excellent flavor, a superior firm and waxy texture, and an improved translucent appearance. This is believed to be due in part to the fact that it is unnecessary to cook the milk at a temperature higher than about 100° F., higher cooking temperatures which impair final texture being frequently employed in conventional operations to counteract the extensive loss of heat from the blocks of curd that are turned and piled in the vat. Another reason for the increased uniformity of good texture and flavor is that in the whey expulsion press the regulation of pressure is correlated with the development of acid and the removal of moisture on the basis of recorded observations rather than simply on visual inspection and judgment of a given operator. Another important advantage is derived from the uniform rinsing and salting of the shredded curd particles, which is in sharp contrast to the hit-or-miss salting operations heretofore carried out by hand on shredded curd particles in the bottom of a cheese vat. It is also of significant importance that cheese prepared by the method and apparatus of the invention has the unique property of curing much more rapidly than heretofore considered possible.

It is to be understood that many variations and modifications will readily occur to those skilled in the art upon reading this description. All such variations and modifications are intended to be included within the scope of the invention as defined in the appended claims.

I claim:

1. Method of making cheese which comprises forming a pressed curd mass by applying external pressure to, and increasing external pressure upon, a suspension of curds in whey while removing whey from the suspension, said whey initially having an acid content of between about 0.16 and about 0.25% and a temperature favorable to acid development, correlating the amount and rate of increase in external pressure to the rate of acid development so as to achieve a reduction in moisture content to between about 35 and 40% and an increase in acid content to between about 0.50 and 0.80% in at least about one hundred minutes, milling the blocks for forming cheese curd, and thereafter washing and salting the cheese with brine solution to give the curd a salt content between about 1.5 and 2%.

2. Method of making cheese which comprises the steps of forming a pressed curd mass by applying external pressure to, and increasing external pressure upon, a suspension of curds in whey while removing whey from the suspension, said whey initially having an acid content of between about 0.16 and about 0.25% and a temperature favorable to acid development, and varying the amount and rate of increase in external to the rate of acid development so as to achieve a reduction in moisture content to between about 35 and 40% and an increase in acid content to between about 0.50 and 0.80%, shredding the pressed curd, and thereafter salting the shredded cheese curd by spraying it with a brine solution for approximately one minute.

3. In a method of making cheese, the improvement which comprises applying external pressure to, and increasing external pressure upon, the entire mass of a suspension of curds in whey while removing whey from the suspension, said whey initially having an acid content of between about 0.16 and about 0.25% and a temperature favorable to acid development, and correlating the amount and rate of increase in external pressure to the rate of acid development so as to produce a reduction in moisture content to between about 35 and 40% while the acid content increases to between about 0.60 and 0.75% in at least about one hundred minutes and the subsequent step of treating the resultant cheese with a brine solution.

4. The method of making cheese which comprises the steps of treating milk to form curds and whey having an acid content of between about 0.16% and 0.25%, forming a fused curd mass by separating the free whey from the curd and applying an external pressure upon the mass greater than the 0.45 pound per square inch at a temperature in the range of 98° F. and 102° F. favorable to acid development, draining free whey from the curd mass while subjected to external pressure, maintaining said pressure for at least 100 minutes to fuse the curd mass and produce an acid content of at least 0.50% and a moisture content between about 35% and 40%, releasing the pressure before the acid content exceeds 0.80%, and thereafter milling the fused curd and salting by means of a brine solution the milled curd prior to hooping.

5. The method of making cheese in accordance with claim 4 in which the milled curd is brine salted by spraying it with a brine for about one minute.

6. Method of making cheese which comprises pressing a curd mass for about 100 minutes to produce a moisture content between about 35 to 40% and an acid content between about 0.50 to about 0.80%, shredding the pressed curd, and salting the shredded cheese curd by spraying the curd with a saturated salt brine for a period of about one minute sufficient to give the curd a salt content between about 1.5 and 2%.

7. Method of making cheese which comprises simultaneously pressing a curd mass for at least 100 minutes and draining whey to produce a moisture content between about 35 to 40% and an acid content between about 0.50 to about 0.80%, cutting the pressed curd into blocks, pressing the blocks for further compaction of the curd, milling the blocks for forming cheese curd, washing the cheese curd, and salting the cheese curd by immersing the curd, for a residence time of about one minute, in a brine solution having a salt concentration of at least about 5%.

References Cited in the file of this patent

UNITED STATES PATENTS

| | | |
|---|---|---|
| 30,638 | McAllister | Nov. 13, 1860 |
| 2,103,545 | Miollis | Dec. 28, 1937 |
| 2,272,954 | Sartori | Feb. 10, 1942 |
| 2,325,217 | Beers | July 27, 1943 |
| 2,492,878 | Miollis | Dec. 27, 1949 |
| 2,494,638 | Stine | Jan. 17, 1950 |
| 2,768,083 | Hensgen | Oct. 23, 1956 |

OTHER REFERENCES

Food, April 1936 (article by H. Silman), pp. 277 to 280.

Food Manufacture, vol. 28, No. 10, October 1953, pp. 404–406.

U.S.D.A. Bulletin 608, revised February 1932, entitled, Varieties of Cheese, pp. 10–11.